Patented Dec. 18, 1923.

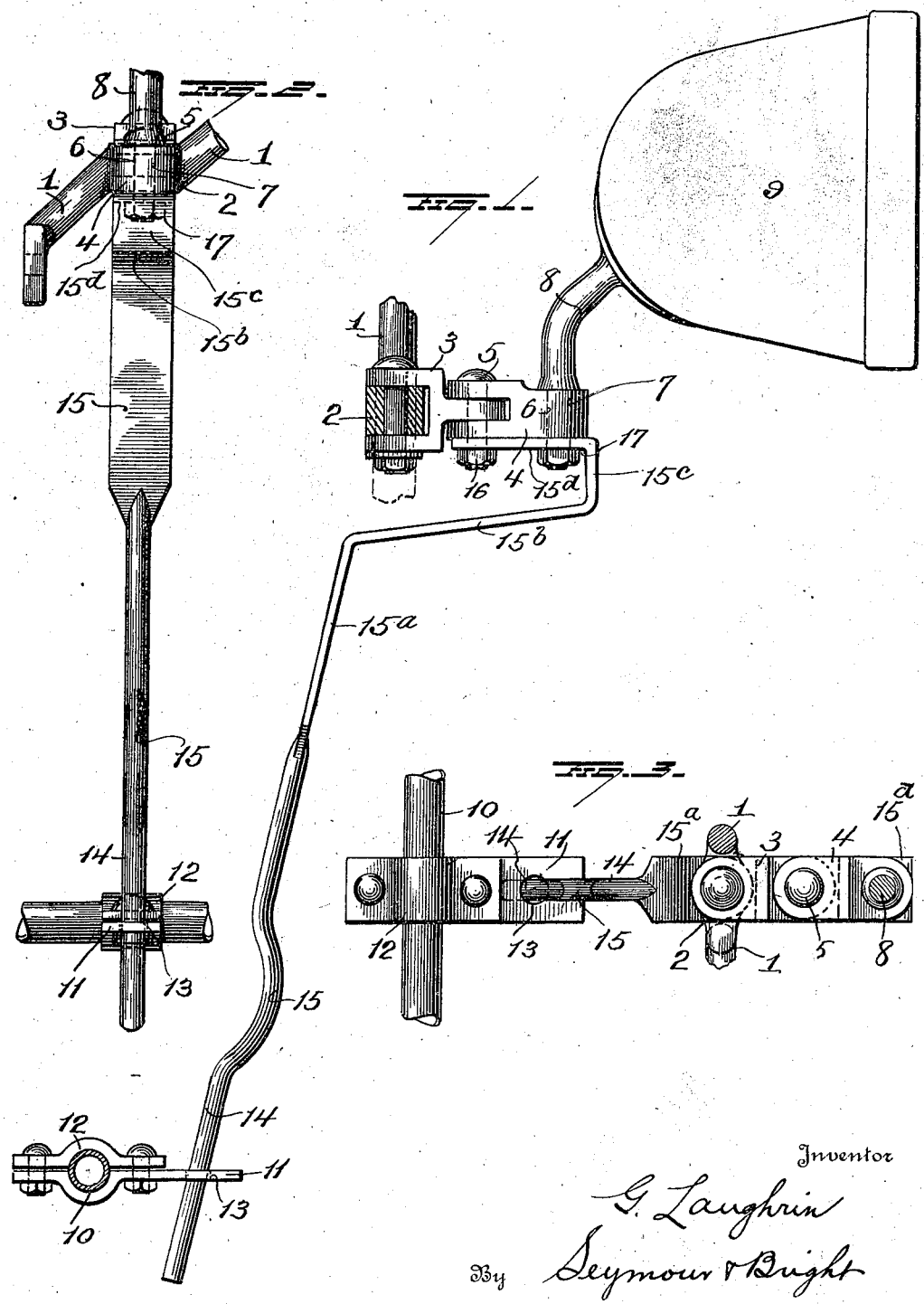

1,478,283

UNITED STATES PATENT OFFICE.

GEORGE LAUGHRIN, OF CHAVA, ILLINOIS.

DIRIGIBLE-LAMP STRUCTURE FOR AUTOMOBILES.

Application filed October 24, 1921. Serial No. 509,845.

*To all whom it may concern:*

Be it known that I, GEORGE LAUGHRIN, a citizen of the United States, and a resident of Chava, in the county of Ogle and State of Illinois, have invented certain new and useful Improvements in Dirigible-Lamp Structures for Automobiles; and I do hereby declare the following to be a full, clear, and exact description of the invention, such as will enable others skilled in the art to which it appertains to make and use the same.

This invention relates to improvements in dirigible lamp structures for automobiles,—the object of the invention being to provide simple and efficient devices which may be readily attached to an automobile of the Ford type and which will operate accurately to shift the headlights when the automobile is turned so that the light will always be projected in the direction in which the car may be running whether in a straight or a curved path.

With this and other objects in view, the invention consists in certain novel features of construction and combinations of parts as hereinafter set forth and pointed out in the claim.

In the accompanying drawings, Figure 1 is a view in elevation, partly broken away, showing an application of my invention. Figure 2 is a view taken at right angles to Figure 1, and Figure 3 is a detail view, partly in section.

It will of course be understood that two structures such as shown in the drawing (one for each headlight) will be employed, but it will suffice to show and describe the details of one of said structures.

One of the fender irons is represented at 1 and provided with a knuckle 2 which ordinarily serves to support the lamp bracket or hanger. Instead of thus supporting said lamp bracket, I utilize the knuckle 2 to support a bifurcated arm 3 which is securely bolted to said knuckle. A bifurcated arm or bracket 4 is pivotally supported as at 5 by the arm 3 and is provided with a hole 6 to receive the shank 7 of a lamp bracket 8, the lamp being indicated at 9.

The steering rod of the car is represented at 10 and to this rod an arm 11 is secured, preferably by clamping means such as indicated at 12. The arm 11 is provided with a slot or opening 13 for the free passage of the lower end of a connecting rod 14, the latter having a bowed portion 15 to avoid the front spring of the car. The lower portions of the rod 14 may have cylindrical cross-section but the upper portion is made flat or elongated in cross-section as indicated at $15^a$. The connecting rod 14 is disposed in a diagonal direction and its upper portion is formed with an outwardly projecting inclined member $15^b$ and a vertical member $15^c$,—from which latter a horizontal member $15^d$ projects rearwardly and is secured to the under side of the arm or bracket 4. The member $15^d$ of the connecting rod may be secured to the bracket 4 by nuts 16—17 secured to the pivot pin 5 and the shank 7 of the lamp brackets respectively.

From the construction and arrangement of parts above described, it is apparent that the lamps or headlights will be held in a position to project the light in a direction parallel with the wheels of the car and that when the steering gear is operated to shift the wheels in making a turn, the headlights will be so shifted as to project the light in the direction in which the car is turning.

Having fully described my invention what I claim as new and desire to secure by Letters Patent, is:

In a dirigible lamp headlight, the combination of a fender iron with a knuckle thereon, a forwardly projecting arm secured rigidly to said knuckle, a bracket pivoted to the front end of said arm and projecting forwardly therefrom, a head light mounted in the front end of said bracket, a steering rod, an arm secured to and projecting forward from the steering rod and having an opening through its forward portion, and a connecting rod passing freely through said arm and extending upwardly and forwardly therefrom, the upper portion of said rod extending forwardly, then upwardly and then rearwardly and overhanging the adjacent forwardly extending portion of the rod and secured rigidly to the under side of the pivoted bracket and to the headlight mounted therein.

In testimony whereof, I have signed this specification in the presence of two subscribing witnesses.

GEORGE LAUGHRIN.

Witnesses:
A. L. DOWDING,
HENRY KASPEN.